H. MULHOLLAND.
VEHICLE WHEEL TIRE.
APPLICATION FILED DEC. 20, 1910.

990,664. Patented Apr. 25, 1911.

Witnesses:
William Miller
Christian H. Almstaedt

Inventor
Hugh Mulholland
By his Attorneys

UNITED STATES PATENT OFFICE.

HUGH MULHOLLAND, OF NEW YORK, N. Y.

VEHICLE-WHEEL TIRE.

990,664.  Specification of Letters Patent.  Patented Apr. 25, 1911.

Application filed December 20, 1910. Serial No. 598,277.

*To all whom it may concern:*

Be it known that I, HUGH MULHOLLAND, a citizen of the United States, residing at the city of New York, county of New York, State of New York, have invented new and useful Improvements in Vehicle-Wheel Tires, of which the following is a specification.

This invention relates to a vehicle wheel tire and especially to that type in which a plurality of solid rubber blocks are positioned in alternate rows on the circumference of the felly or tire of the wheel.

The invention is essentially adapted for automobiles and heavy auto trucks, the rubber blocks constituting a series of cushioning resilient treads designed to be non-skidding and give positive contact to the ground.

The invention resides in the peculiar method of interlocking the rubber blocks in a series of channels formed in plates which are fastened to a metallic band arranged on the periphery of the wheel felly. The base portion of each of the solid blocks is vulcanized into the channels of a plate thus interlocking the block to the plate and preventing lateral as well as tangential displacement of the block.

Figure 1:
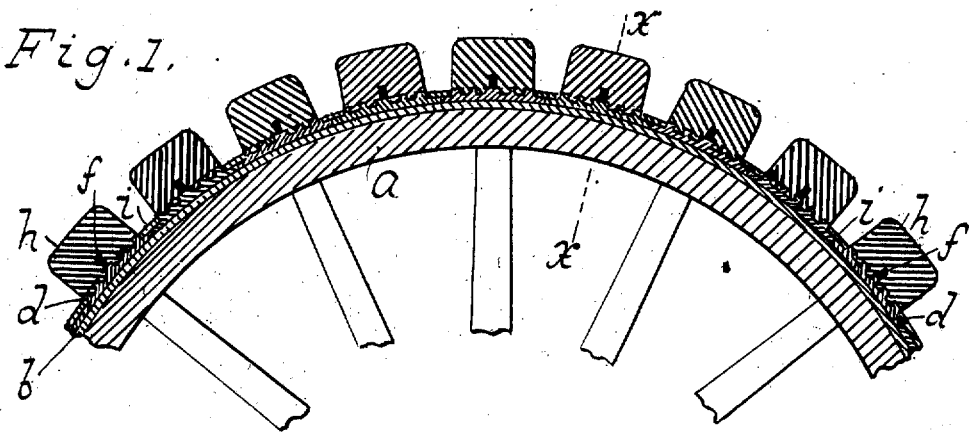
Figure 2:
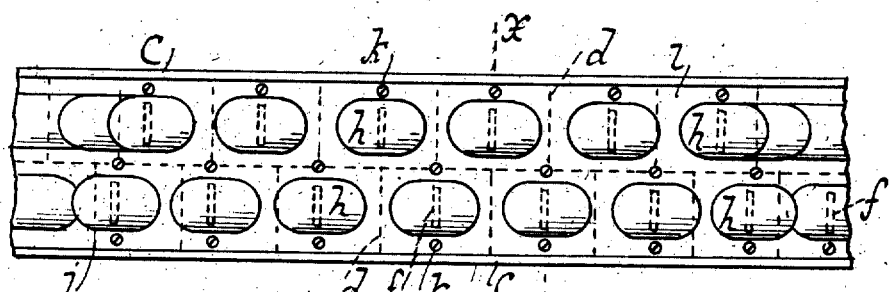
Figure 3:
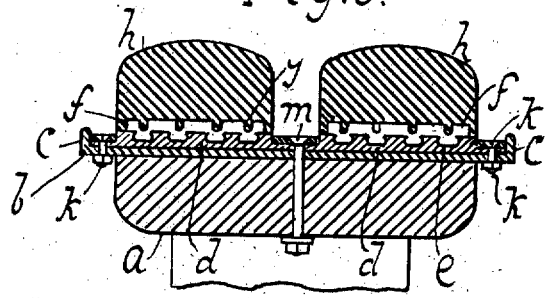
Figure 4:
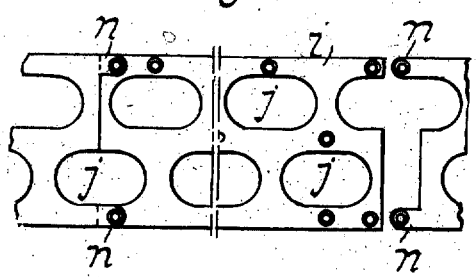
Figure 5:
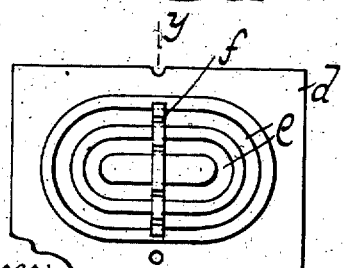
Figure 6:
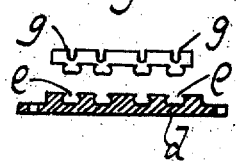

The novel features of this invention are more fully described in the following specification and claims and illustrated in the accompanying drawing in which:

Figure 1 represents a vertical section of a vehicle wheel embodying this invention. Fig. 2 is a plan view of the same. Fig. 3 is a transverse section taken along line $x\ x$ Fig. 1. Fig. 4 is a plan view of the upper plates. Fig. 5 is a plan view of a channel plate and key. Fig. 6 is a section taken along $y\ y$ of Fig. 5.

In this drawing the letter $a$ designates the felly of a wheel of ordinary construction and adapted for automobiles and similar self propelled vehicles. On the said felly is disposed a metallic band $b$ having upwardly extending flanges $c$ which form the rim of the wheel. On this band are arranged a series of plates $d$ each plate being provided with a number of channels $e$ formed in the top of the plate. On each of the said plates is arranged a key $f$ molded of hard rubber and extending transversely on a plate, the base thereof being vulcanized into the said channels thus uniting the key to the plate. The upper portion of the key is preferably provided with notches or grooves $g$ as illustrated in Fig. 6. Each of the plates $d$ carries a rubber block $h$ the base portion of which is vulcanized into the channels in the plate and into the grooves formed on the key. Each block is thus held and firmly united to a plate before the plates are disposed on the wheel. The base portion of each plate extends beyond the sides and ends of the rubber block and on this portion of the plates is disposed a plate $i$ which has openings $j$ to fit around the blocks. There may be any number of these plates but it has been found that three are sufficient on a wheel constructed like the above. These plates are fastened to the band by means of a series of counter sunk bolts $k$ and to the felly of the wheel by a series of bolts $m$. The formation of the plates are shown in Fig. 4 and the ends of the plates have ears or projections $n$ to overlap the preceding plate and thus fasten the plates together and at the same time, to the band by the said bolts $k$.

The channels in each of the plates are shown continuous as seen in Fig. 5. and when a rubber block is vulcanized in the channels it forms an inexpensive and secure way of uniting a block to a plate. It will be seen that when a block becomes worn the plate and its block can be readily removed from the wheel and other blocks substituted. The upper plates $i$ when in place and bolted to the band form a smooth structure. the openings in the plate being of the same shape as the exterior of the rubber blocks prevent lodgment of dirt where the rubber is joined to the plate. It should be said the plates $i$ with the bolts $k$ and $m$ co-act with holes in the plates $d$ and thus firmly bolt the said plates to the band and felly of the wheel.

I claim.

1. In a vehicle tire, the combination with a metallic band, of a plurality of series of plates each plate having continuous channels, a plurality of rubber tread blocks positioned one on each plate, said channels in said plates being adapted to interlock with the base portion of each tread block, and means for securing the plates and blocks in operative position on the metallic band.

2. In a vehicle tire, the combination with a metallic band, of a plurality of series of plates each plate having continuous channels, a plurality of rubber tread blocks one being positioned on each plate, a key to engage the channels, the base portion of each tread block being adapted to engage the key and vulcanized to interlock in the channels of one of the plates, and means for securing
5 the plates and blocks in operative position on the metallic band.

In testimony whereof I have hereunto set my hand in the presence of two subscribing witnesses.

HUGH MULHOLLAND.

Witnesses:
WM. E. WARLAND,
CHRISTIAN H. OLMSTEADT.

Copies of this patent may be obtained for five cents each, by addressing the "Commissioner of Patents, Washington, D. C."